(12) United States Patent
Saito et al.

(10) Patent No.: US 11,912,016 B2
(45) Date of Patent: *Feb. 27, 2024

(54) MEDIUM-DISCHARGING DEVICE AND RECORDING APPARATUS

(71) Applicant: SEIKO EPSON CORPORATION, Tokyo (JP)

(72) Inventors: Kazuo Saito, Shiojiri (JP); Hiroki Shinagawa, Shiojiri (JP); Satoru Orii, Matsumoto (JP); Katsumi Yamada, Matsumoto (JP); Nobuhisa Nomoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,985

(22) Filed: Mar. 7, 2023

(65) Prior Publication Data

US 2023/0219352 A1 Jul. 13, 2023

Related U.S. Application Data

(63) Continuation of application No. 17/374,169, filed on Jul. 13, 2021, now Pat. No. 11,618,269.

(30) Foreign Application Priority Data

Jul. 15, 2020 (JP) .................................. 2020-121395

(51) Int. Cl.
*B41J 11/00* (2006.01)
*B41J 13/10* (2006.01)
(Continued)

(52) U.S. Cl.
CPC ............. *B41J 11/0065* (2013.01); *B41J 2/01* (2013.01); *B41J 3/44* (2013.01); *B41J 13/106* (2013.01);
(Continued)

(58) Field of Classification Search
CPC ... B41J 11/0065; B41J 2/01; B41J 3/44; B41J 13/106; B41J 25/00; B41J 29/393;
(Continued)

(56) References Cited

U.S. PATENT DOCUMENTS 11,618,269 B2 * 4/2023 Saito .................. H04N 1/00633
347/16
2005/0162494 A1 7/2005 Inokuchi
(Continued)

FOREIGN PATENT DOCUMENTS

JP H05-043112 2/1993
JP H06-115795 4/1994
(Continued)

*Primary Examiner* — Henok D Legesse
(74) *Attorney, Agent, or Firm* — WORKMAN NYDEGGER

(57) ABSTRACT

A medium-discharging device includes: a medium-discharging section that discharges a medium; a medium-receiving tray that receives the medium discharged by the medium-discharging section; a light-emitting section that emits light to the medium-receiving tray; and a control section that controls the light-emitting section, in which the medium-receiving tray is configured to switch between a first state in which the medium-receiving tray is stored in an apparatus main body that includes the medium-discharging section and a second state in which the medium-receiving tray protrudes from the apparatus main body, and the control section controls the light-emitting section in accordance with a state or operation of the medium-receiving tray.

7 Claims, 9 Drawing Sheets

(51) Int. Cl.
  *B41J 3/44* (2006.01)
  *B41J 29/393* (2006.01)
  *H04N 1/00* (2006.01)
  *B65H 31/20* (2006.01)
  *B65H 31/02* (2006.01)
  *B41J 25/00* (2006.01)
  *B41J 2/01* (2006.01)

(52) U.S. Cl.
  CPC .............. *B41J 25/00* (2013.01); *B41J 29/393* (2013.01); *B65H 31/02* (2013.01); *B65H 31/20* (2013.01); *H04N 1/00633* (2013.01); *B41J 11/0095* (2013.01); *B65H 2301/4212* (2013.01); *B65H 2402/46* (2013.01); *B65H 2405/324* (2013.01); *B65H 2511/10* (2013.01); *B65H 2551/20* (2013.01); *B65H 2801/12* (2013.01); *B65H 2801/15* (2013.01)

(58) Field of Classification Search
  CPC ...... B41J 11/0095; B65H 31/02; B65H 31/20; B65H 2301/4212; B65H 2402/46; B65H 2405/324; B65H 2511/10; B65H 2551/20; B65H 2801/12; B65H 2801/15; H04N 1/00633
  See application file for complete search history.

(56) References Cited

U.S. PATENT DOCUMENTS

| | | |
|---|---|---|
| 2018/0029393 A1 | 2/2018 | Matsumoto |
| 2019/0052759 A1 | 2/2019 | Ohata |
| 2020/0055688 A1 | 2/2020 | Clayburn |
| 2022/0053097 A1 | 2/2022 | Saito et al. |

FOREIGN PATENT DOCUMENTS

| | | |
|---|---|---|
| JP | H08-339107 | 12/1996 |
| JP | 2002-052778 | 2/2002 |
| JP | 2018-016480 | 2/2018 |
| JP | 2018-158835 | 10/2018 |
| JP | 2022-033436 | 3/2022 |

* cited by examiner

MEDIUM-DISCHARGING DEVICE AND RECORDING APPARATUS

This application is a continuation application of U.S. patent application Ser. No. 17/374,169, filed Jul. 13, 2021, which claims the benefit of and priority to JP Application Serial Number 2020-121395, filed Jul. 15, 2020, the disclosure of which is hereby incorporated by reference herein in their entirety.

BACKGROUND

1. Technical Field

The present disclosure relates to a medium-discharging device that discharges a medium and a recording apparatus that includes the medium-discharging device.

2. Related Art

A discharging mechanism that discharges a medium has a known configuration in which a discharging space for discharging the medium is provided in a housing of an apparatus and in which a lamp that illuminates the interior of the discharging space is provided as described in JP-A-8-339107 in view of poor visibility due to a dark interior of the discharging space.

According to the configuration of JP-A-8-339107, when paper, which is an example of a medium, is discharged to a tray, the lamp provided in the ceiling of the discharging space is illuminated. This makes it easy for a user to check or remove the discharged paper and to notice that the paper has been discharged.

Moreover, JP-A-2018-016480 discloses a configuration in which a discharging tray that receives a discharged sheet is moved between a developed position and a contained position by power from a motor.

According to the configuration described in JP-A-2018-016480, when a recording command is issued while the discharging tray is at the contained position, a discharging roller rotates, the rotation of the discharging roller is transferred to the discharging tray, and the discharging tray moves from the contained position to the developed position. Thus, a user is able to regard the developing operation of the discharging tray as an indicator of a sheet being discharged. More specifically, it can be said that the operation of the discharging tray functions as a way of indicating a status regarding discharging of a sheet.

However, it can be said that the status regarding discharging of a sheet is desirably indicated with better visibility to improve usability.

SUMMARY

To address the aforementioned problem, a medium-discharging device of the disclosure includes: a medium-discharging section that discharges a medium; and a medium-receiving tray that receives the medium discharged by the medium-discharging section, in which the medium-receiving tray is configured to switch between a first state in which the medium-receiving tray is stored in an apparatus main body that includes the medium-discharging section and a second state in which the medium-receiving tray protrudes from the apparatus main body, a light-emitting section that emits light to the medium-receiving tray is provided downstream of the medium-discharging section in a medium-discharging direction, and a control section that controls the light-emitting section controls the light-emitting section in accordance with a state or operation of the medium-receiving tray.

A recording apparatus of the disclosure includes: a recording section that performs recording on a medium; a medium-discharging section that discharges the medium subjected to recording by the recording section; and a medium-receiving tray that receives the medium discharged by the medium-discharging section, in which the medium-receiving tray is configured to switch between a first state in which the medium-receiving tray is stored in an apparatus main body that includes the medium-discharging section and a second state in which the medium-receiving tray protrudes from the apparatus main body, a light-emitting section that emits light to the medium-receiving tray is provided downstream of the medium-discharging section in a medium-discharging direction, the medium-receiving tray is configured to switch between the first state and the second state by receiving power from a motor, and when the medium-receiving tray is in the first state and the light-emitting section is in a light-off state, upon receiving a recording start instruction, a control section that controls a light-emission state of the light-emitting section causes the light-emitting section to emit light in response to control of the motor that causes the medium-receiving tray to protrude from the apparatus main body.

A recording apparatus of the disclosure includes: a recording section that performs recording on a medium; a medium-discharging section that discharges the medium subjected to recording by the recording section; and a medium-receiving tray that receives the medium discharged by the medium-discharging section, in which the medium-receiving tray is configured to switch between a first state in which the medium-receiving tray is stored in an apparatus main body that includes the medium-discharging section and a second state in which the medium-receiving tray protrudes from the apparatus main body, a light-emitting section that emits light to the medium-receiving tray is provided downstream of the medium-discharging section in a medium-discharging direction, a control section that controls the light-emitting section is configured to detect at least whether the medium-receiving tray is in the first state, and when the medium-receiving tray is in the first state and the light-emitting section is in a light-off state, upon receiving a recording start instruction, the control section does not cause the light-emitting section to emit light, and when the medium-receiving tray is in a state other than the first state and the light-emitting section is in the light-off state, upon receiving the recording start instruction, the control section causes the light-emitting section to emit light.

DESCRIPTION OF EXEMPLARY EMBODIMENTS

Figure 1:
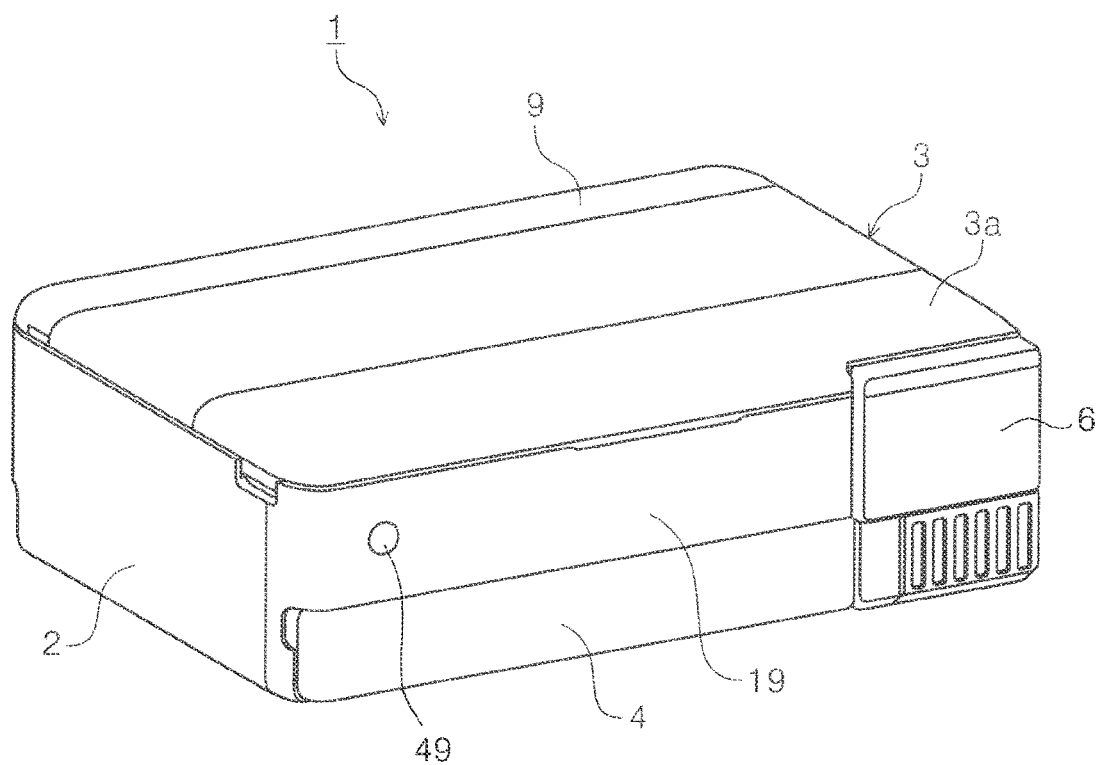
FIG. 1 is a perspective view of a printer when a paper receiving tray is in a first state.
Figure 1:
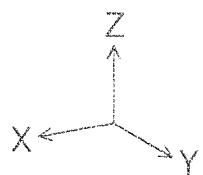

Hereinafter, the disclosure will be schematically described.

A medium-discharging device according to a first aspect includes: a medium-discharging section that discharges a medium; a medium-receiving tray that receives the medium discharged by the medium-discharging section; a light-emitting section that emits light to the medium-receiving tray; and a control section that controls the light-emitting section, in which the medium-receiving tray is configured to switch between a first state in which the medium-receiving tray is stored in an apparatus main body that includes the medium-discharging section and a second state in which the medium-receiving tray protrudes from the apparatus main body, and the control section controls the light-emitting section in accordance with a state or operation of the medium-receiving tray.

According to the present aspect, since the control section that controls the light-emitting section controls the light-emitting section in accordance with the state or operation of the medium-receiving tray, it is possible for a status regarding discharging of the medium to be clearly visually indicated, thereby improving usability.

According to a second aspect, in the first aspect, the medium-receiving tray is configured to switch between the first state and the second state by receiving power from a motor controlled by the control section, and when the control section causes the medium-receiving tray in the first state to protrude from the apparatus main body, the control section causes the light-emitting section to emit light.

According to the present aspect, since the control section causes the light-emitting section to emit light when the control section causes the medium-receiving tray in the first state to protrude from the apparatus main body, a user is able to identify that the medium-receiving tray has switched its state in accordance with continuous emission of the light-emitting section.

Note that, in the present specification, "light emission" of the light-emitting section includes both continuous emission and flashing, and, when simply referred to as "light emission", it means either continuous emission or flashing.

According to a third aspect, in the first aspect, the medium-receiving tray is configured to switch between the first state and the second state by receiving power from a motor controlled by the control section, and when the medium-receiving tray does not switch to a target state even after the motor is driven by a predetermined amount, the control section changes a light-emission state of the light-emitting section.

According to the present aspect, when the medium-receiving tray does not switch to the target state even after the motor is driven by the predetermined amount, the control section changes the light-emission state of the light-emitting section, and the user is thus able to identify an occurrence of abnormality in the operation of the medium-receiving tray in accordance with the change in the light-emission state of the light-emitting section.

According to a fourth aspect, in the second or third aspect, when a mode shifts to a power-saving mode for saving power in a state in which the medium-receiving tray exits the first state and protrudes from the apparatus main body and in which the light-emitting section emits light, the control section switches the light-emitting section to a light-off state.

According to the present aspect, when the mode shifts to the power-saving mode for saving power in the state in which the medium-receiving tray exits the first state and protrudes from the apparatus main body and in which the light-emitting section emits light, the control section switches the light-emitting section to the light-off state, and it is thus possible to avoid wasteful power consumption.

According to a fifth aspect, in any of the second to fourth aspects, when a power button is pressed in a state in which the medium-receiving tray exits the first state and protrudes from the apparatus main body and in which the light-emitting section emits light, the control section switches the light-emitting section to the light-off state.

According to the present aspect, when the power button is pressed in the state in which the medium-receiving tray exits the first state and protrudes from the apparatus main body and in which the light-emitting section emits light, the control section switches the light-emitting section to the light-off state, and the user is thus able to view shifting of the state of the apparatus to a power-off state.

A recording apparatus according to a sixth aspect includes: a recording section that performs recording on a medium; and the medium-discharging device according to any of the first to fifth aspects that discharges the medium subjected to recording by the recording section.

According to the present aspect, the recording apparatus that performs recording on the medium exerts any of the action effects of the first to fifth aspects described above.

A recording apparatus according to a seventh aspect includes: a recording section that performs recording on a medium; a medium-discharging section that discharges the medium subjected to recording by the recording section; a medium-receiving tray that receives the medium discharged by the medium-discharging section; a light-emitting section that emits light to the medium-receiving tray; and a control section that controls the light-emitting section, in which the medium-receiving tray is configured to switch between a first state in which the medium-receiving tray is stored in an apparatus main body that includes the medium-discharging section and a second state in which the medium-receiving tray protrudes from the apparatus main body, the medium-receiving tray is configured to switch between the first state and the second state by receiving power from a motor, and when the medium-receiving tray is in the first state and the light-emitting section is in a light-off state, upon receiving a recording start instruction, the control section causes the light-emitting section to emit light in response to control of the motor that causes the medium-receiving tray to protrude from the apparatus main body.

According to the present aspect, upon receiving the recording start instruction when the medium-receiving tray is in the first state and the light-emitting section is in the light-off state, the control section that controls the light-emitting section causes the light-emitting section to emit light in response to control of the motor that causes the medium-receiving tray to protrude from the apparatus main body, and the user is thus able to view switching of the medium-receiving tray in accordance with light emission of the light-emitting section, thus improving usability.

A recording apparatus according to an eighth aspect includes: a recording section that performs recording on a medium; a medium-discharging section that discharges the medium subjected to recording by the recording section; a medium-receiving tray that receives the medium discharged by the medium-discharging section; a light-emitting section that emits light to the medium-receiving tray; and a control section that controls the light-emitting section, in which the medium-receiving tray is configured to switch between a first state in which the medium-receiving tray is stored in an apparatus main body that includes the medium-discharging section and a second state in which the medium-receiving tray protrudes from the apparatus main body, the control section is configured to detect at least whether the medium-receiving tray is in the first state, and when the medium-receiving tray is in the first state and the light-emitting section is in a light-off state, upon receiving a recording start instruction, the control section does not cause the light-emitting section to emit light, and when the medium-receiving tray is in a state other than the first state and the light-emitting section is in the light-off state, upon receiving the recording start instruction, the control section causes the light-emitting section to emit light.

According to the present aspect, the control section that controls the light-emitting section is configured to detect at least whether the medium-receiving tray is in the first state, and when the medium-receiving tray is in the first state and the light-emitting section is in the light-off state, upon receiving the recording start instruction, the control section does not cause the light-emitting section to emit light, and when the medium-receiving tray is in a state other than the first state and the light-emitting section is in the light-off state, upon receiving the recording start instruction, the control section causes the light-emitting section to emit light, and the user is thus able to view the state of the medium-receiving tray in accordance with the state of the light-emitting section, thus improving usability.

According to a ninth aspect, in the eighth aspect, when the medium-receiving tray in the first state exits the first state, the control section causes the light-emitting section to emit light.

According to the present aspect, when the medium-receiving tray in the first state exits the first state, the control section causes the light-emitting section to emit light, and the user is thus able to view switching of the state of the medium-receiving tray in accordance with light emission of the light-emitting section.

Hereinafter, the disclosure will be specifically described.

Note that, in the drawings, a direction extending along the X-axis is an apparatus width direction and is a direction intersecting a paper transport direction in which paper, which is an example of the medium, is transported, in other words, a paper width direction. From the view of the user facing the front of the apparatus, a −X direction is a right direction and a +X direction is a left direction.

A direction extending along the Y-axis is an apparatus depth direction, a +Y direction is a direction extending from the rear of the apparatus to the front of the apparatus, and a −Y direction is a direction extending from the front of the apparatus to the rear of the apparatus. The +Y direction is a paper discharging direction extending from a discharging port 17 through which paper subjected to recording is discharged. In the present embodiment, of the peripheral surfaces of the apparatus, a surface on which a front cover 4 is provided is the apparatus front surface.

A direction extending along the Z-axis is a vertical direction, a +Z direction is a vertically up direction, and a −Z direction is a vertically down direction.

Note that, in the following description, a direction in which paper is transported may be referred to as "downstream", and a direction opposite thereto may be referred to as "upstream".

Figure 2:
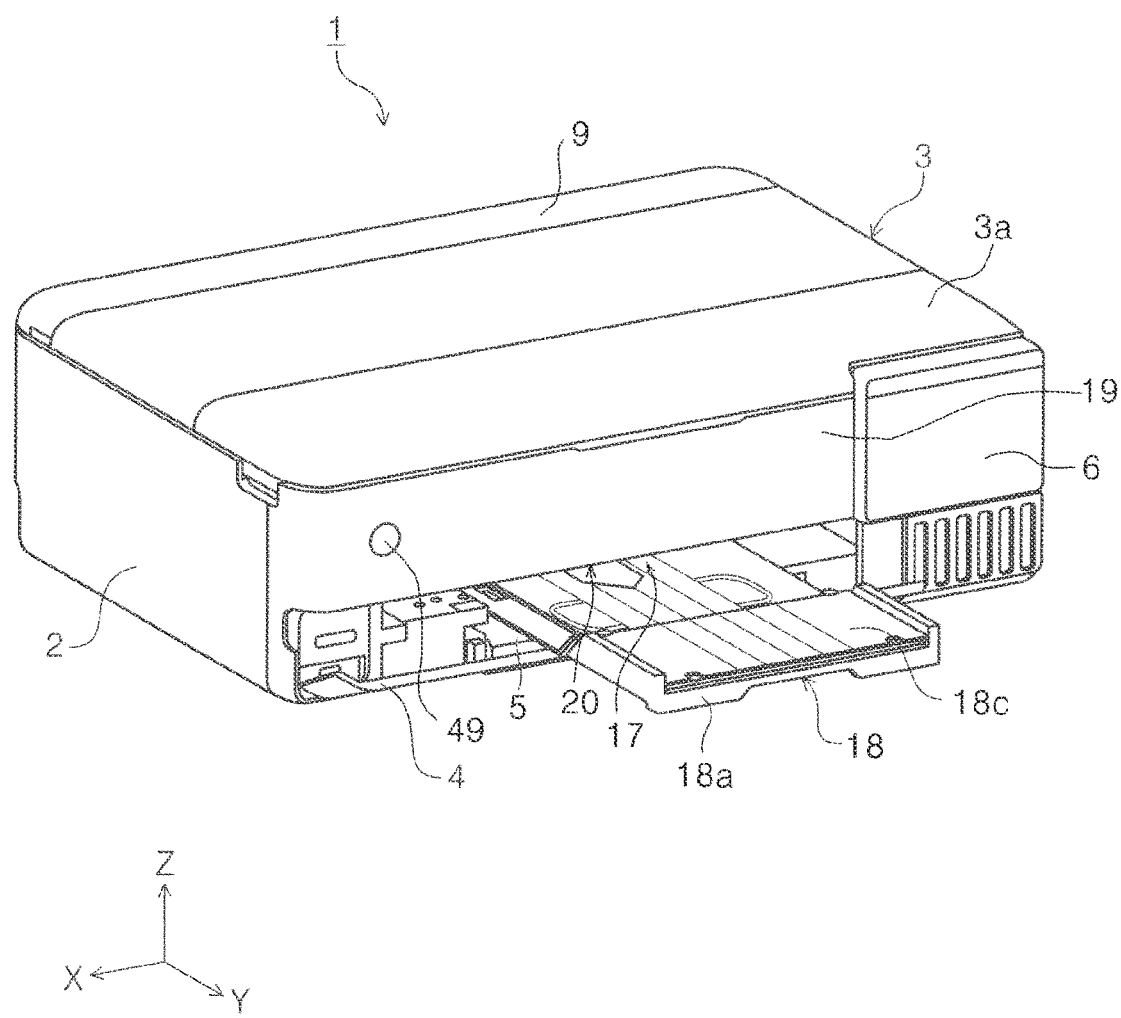
FIG. 2 is a perspective view of the printer when the paper receiving tray is in a third state.
Figure 3:
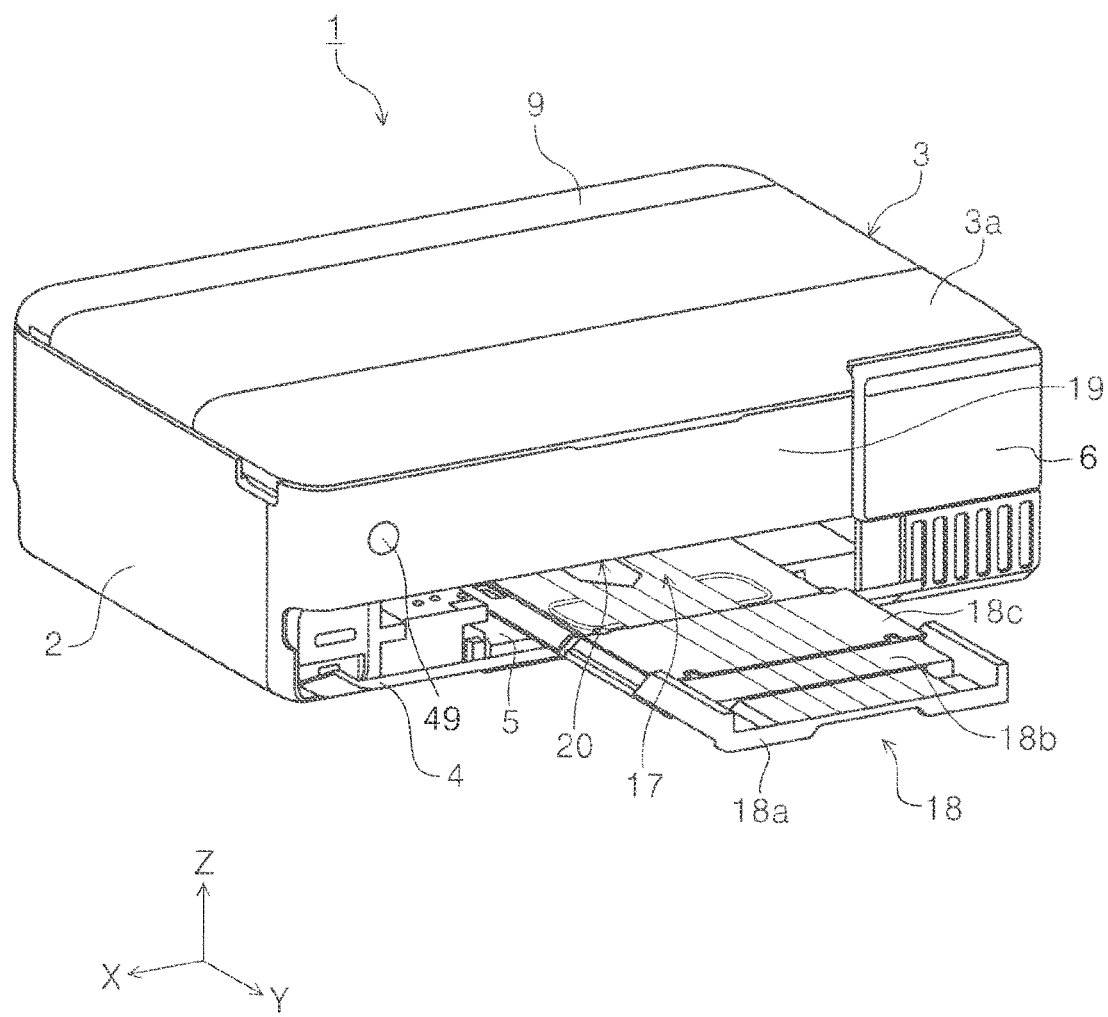
FIG. 3 is a perspective view of the printer when the paper receiving tray is in a second state.

In FIGS. 1 to 3, an ink jet printer 1, which is an example of the recording apparatus, is a so-called multifunctional peripheral that includes a scanner section 3 disposed on an apparatus main body 2. Hereinafter, the ink jet printer 1 is abbreviated as "printer 1".

The scanner section 3 is provided so as to be rotatable with respect to the apparatus main body 2, and, by rotating, can take a closed state as illustrated in FIG. 1 and an open state (not illustrated). The scanner section 3 includes a document cover 3a that covers/exposes a document platen 3b (refer to FIG. 4).

An upper cover 9 is provided on the top of the apparatus main body 2 on the rear surface side with respect to the document cover 3a. When the upper cover 9 is opened, paper is able to be set on a hopper 12 (refer to FIG. 4).

On the apparatus front surface, the apparatus main body 2 includes an operation panel 6 for setting various operation settings. In the present embodiment, the operation panel 6 is constituted by a touch panel. The operation panel 6 is provided so as to be tiltable about a rotation axis (not illustrated).

The front cover 4 is provided on a lower portion of the front surface of the apparatus main body 2. The front cover 4 is provided so as to be rotatable with respect to a paper feed tray 5 positioned in a lower portion of the apparatus main body 2, and by rotating, can take a closed state as illustrated in FIG. 1 and an open state as illustrated in FIGS. 2 and 3.

Opening the front cover 4 exposes the discharging port 17 through which paper subjected to recording is discharged and exposes a paper receiving tray 18 as the medium-receiving tray that receives the paper discharged through the discharging port 17.

The paper receiving tray 18 is able to be switched between a first state in which the paper receiving tray 18 is stored in the apparatus main body 2 and a second state in which the paper receiving tray 18 protrudes furthest in the +Y direction as illustrated in FIG. 3. Note that the state of the paper receiving tray 18 illustrated in FIG. 2 indicates a third state between the first state and the second state.

The paper receiving tray 18 switches its state when receiving power from a tray driving motor 60 (refer to FIG. 5) via a rack-and-pinion mechanism (not illustrated). Whether the paper receiving tray 18 switches from the first state to the second state or the third state is determined by a control section 50 (refer to FIG. 5) in accordance with paper size information included in printing information.

Note that the power of the tray driving motor 60 (refer to FIG. 5) enables the paper receiving tray 18 to switch not only from the first state to the second state but also from the second state to the first state. However, switching of the paper receiving tray 18 from the second state to the third state may be performed by a user operation, and switching from the third state to the first state may be performed upon receiving power from the tray driving motor 60. Alternatively, switching of the paper receiving tray 18 from the second state to the first state may be performed by a user operation.

Note that, in the present embodiment, the paper receiving tray 18 is able to take not only the second state but also the third state and receive paper in not only the second state but also the third state. However, the third state may be omitted; in other words, in such an instance, the paper receiving tray 18 may receive paper in only the second state. In contrast, in other instances, the paper receiving tray 18 may receive paper in not only the second state and the third state but also another state.

In the present embodiment, in the third state illustrated in FIG. 2, for example, when A4-size paper is discharged with a long side thereof in the Y-axis direction, the paper is able to be received. Moreover, in the second state illustrated in FIG. 3, for example, when A3-size paper is discharged with a long side thereof in the Y-axis direction, the paper is able to be received.

In the present embodiment, the paper receiving tray 18 includes a first tray 18c, a second tray 18b, and a third tray 18a as illustrated in FIG. 3.

When switching from the stored state, that is, the first state in FIG. 1, to the third state in FIG. 2, the paper receiving tray 18 is displaced in the +Y direction while the first tray 18c, the second tray 18b, and the third tray 18a are integrated.

When the paper receiving tray 18 switches from the third state in FIG. 2 to the second state in FIG. 3, the second tray 18b and the third tray 18a are displaced in the +Y direction with respect to the first tray 18c. In a state in which the paper receiving tray 18 switches to the second state, the second tray 18b is positioned in the +Y direction with respect to the first tray 18c, and the third tray 18a is positioned in the +Y direction with respect to the second tray 18b as illustrated in FIG. 3.

Although the paper receiving tray 18 of the present embodiment is configured to be a multi-stage type as described above, the paper receiving tray 18 may be configured as a single tray. Also in such an instance, when a rack-and-pinion mechanism having a rack in the Y-axis direction in the tray and having a pinion gear that engages the rack is formed, the tray is able to be displaced in the Y-axis direction by power from the motor. Also in such a configuration, the tray is able to be switched between the first state in which the tray is stored in the apparatus main body 2 and the second state in which the tray protrudes further than in the first state and protrudes furthest from the apparatus main body 2 in the +Y direction.

Figure 4:
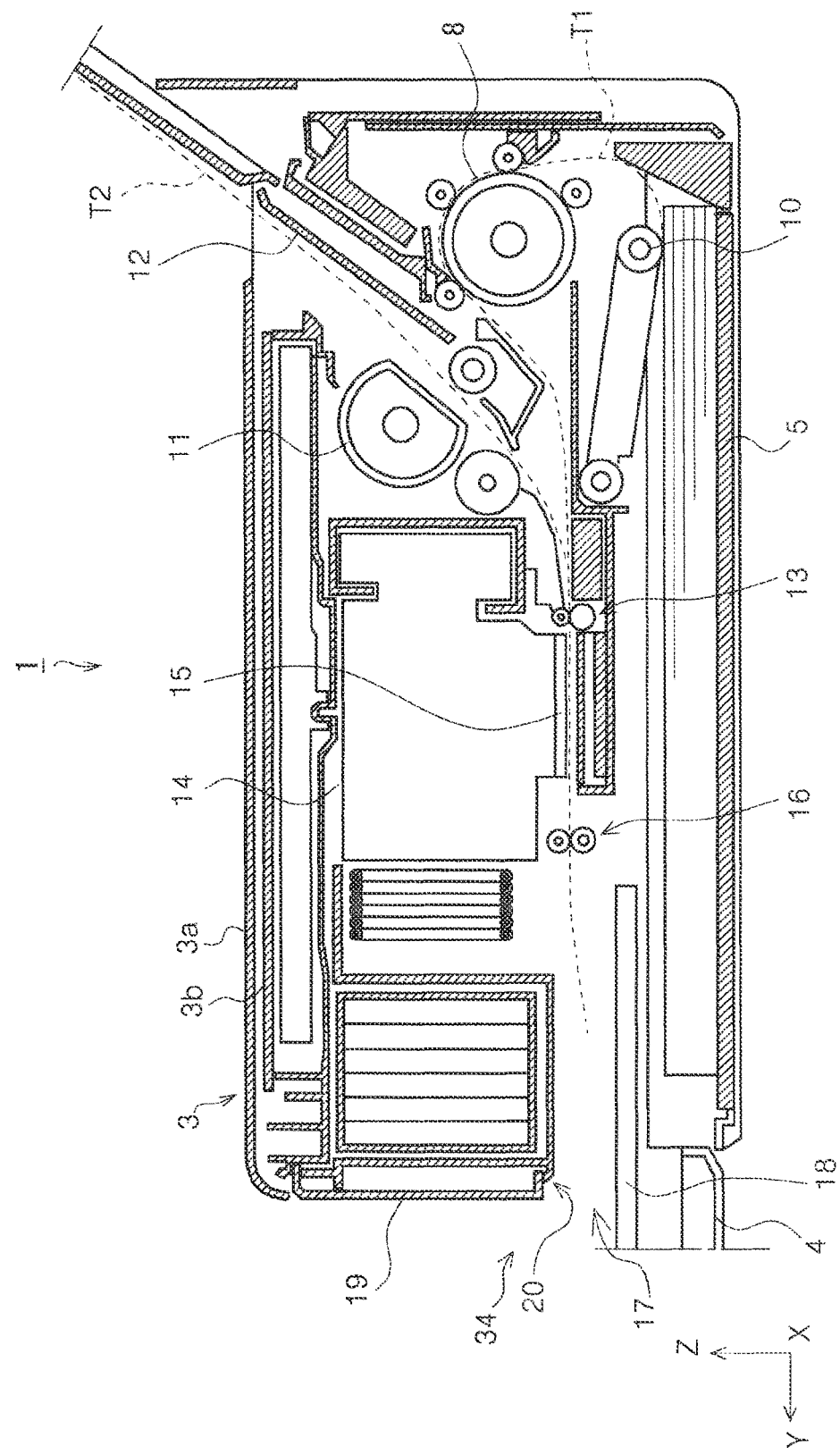
FIG. 4 illustrates a paper transport path of the printer.

Next, a paper transport path of the printer 1 will be further described with reference to FIG. 4. Paper stored in the paper feed tray 5 positioned in the lower portion of the apparatus main body 2 is fed in the −Y direction by a feed roller 10 driven by a feed motor 52 (refer to FIG. 5). Feed path T1 is used for the paper fed from the paper feed tray 5.

Figure 5:
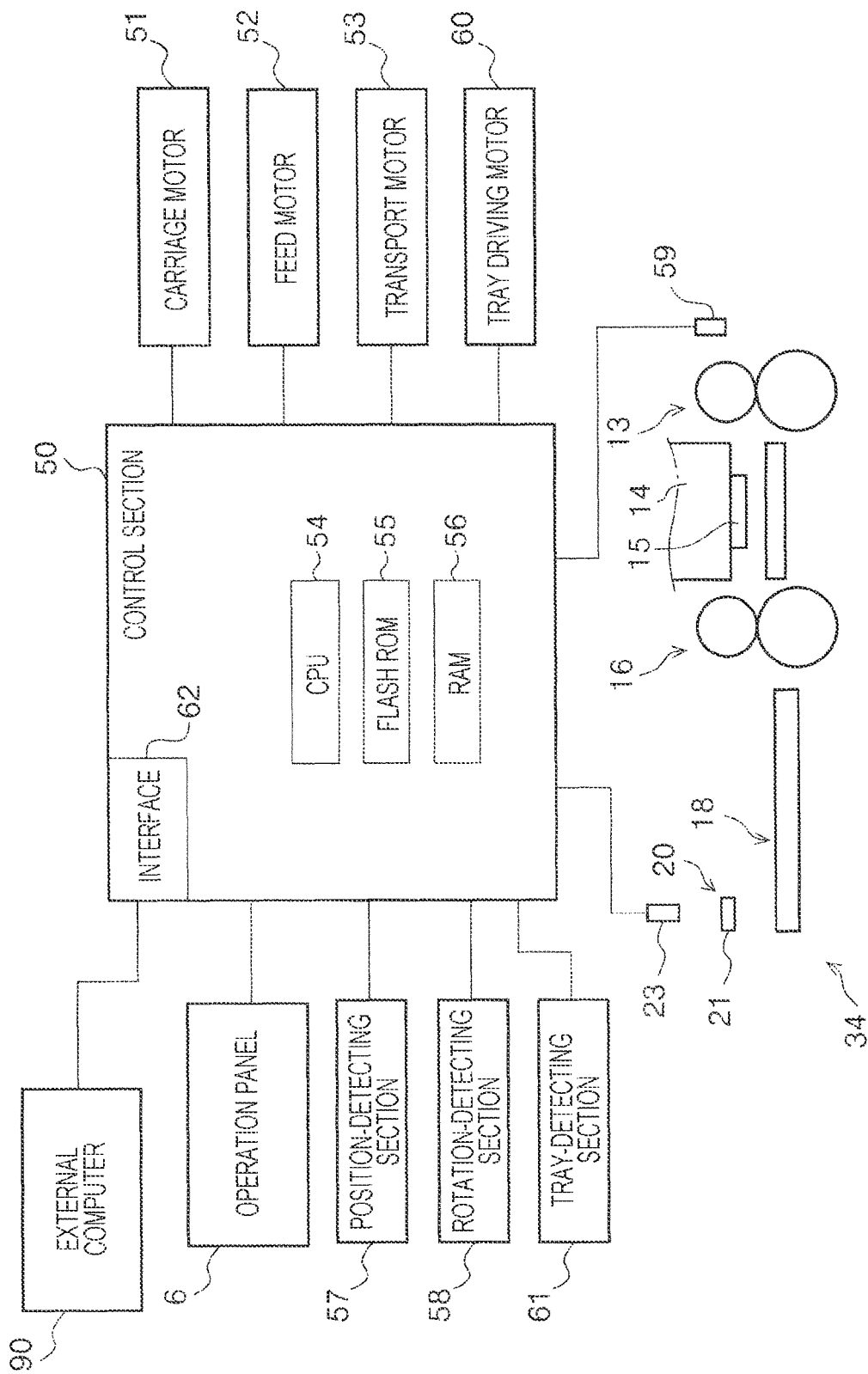
FIG. 5 is a block diagram illustrating a control system of the printer.

Paper set in the hopper 12 abuts a feed roller 11 when the hopper 12 rises, and the paper is fed downstream upon rotation of the feed roller 11 driven by the feed motor 52 (refer to FIG. 5). Feed path T2 is used for the paper fed from the hopper 12.

A reverse roller 8 driven by the feed motor 52 (refer to FIG. 5) is provided above the feed roller 10, and the paper fed from the paper feed tray 5 or the hopper 12 receives a feeding force from the reverse roller 8 and is fed to a transport roller pair 13 positioned in the +Y direction with respect to the reverse roller 8.

The paper is then transported to a region facing a recording head 15, that is, a recording region, by the transport roller pair 13 driven by a transport motor 53 (refer to FIG. 5).

The recording head 15, which is an example of the recording section, is provided in a carriage 14, and the carriage 14 is reciprocated in the X-axis direction by power from a carriage motor 51 (refer to FIG. 5). In response to a moving operation of the carriage 14, the recording head 15 ejects ink onto the paper.

The paper subjected to recording is discharged to the paper receiving tray 18 by a discharging roller pair 16 driven by the transport motor 53 (refer to FIG. 5).

Note that the discharging roller pair 16 is an example of the medium-discharging section that discharges paper subjected to recording. The discharging roller pair 16, the paper receiving tray 18, and a light-emitting section 23 (refer to FIG. 5) that is to be described later constitute a paper discharging device 34, which is an example of the medium-discharging device.

Next, a control system of the printer 1 will be described with reference to FIG. 5.

The control section 50 performs various kinds of control of the printer 1, including control of paper feeding, paper transporting, paper discharging, and recording on paper, and other types of control.

A signal from the operation panel 6 is input to the control section 50, and a signal for performing display on the operation panel 6, particularly, a user interface (hereinafter, referred to as "UI") is transmitted from the control section 50 to the operation panel 6.

The control section 50 controls the motors of the carriage motor 51, the feed motor 52, the transport motor 53, and the tray driving motor 60. In the present embodiment, each of the motors is a DC motor.

Detection signals from detecting sections of a position-detecting section 57, a rotation-detecting section 58, a medium-detecting section 59, and a tray-detecting section 61 are also input to the control section 50.

The position-detecting section 57 is a linear encoder detecting section that detects a position of the carriage 14 in the X-axis direction. The rotation-detecting section 58 is a rotary encoder detecting section that detects a rotation amount and a rotation speed of a roller driven by the transport motor 53.

The medium-detecting section 59 is provided near upstream of the transport roller pair 13 and detects passing of a leading end and a trailing end of paper. The medium-detecting section 59 may be constituted by a contact or non-contact sensor. The control section 50 is able to identify whether or not paper is correctly fed, specifically, whether or not non-feeding is caused in accordance with detection information of the medium-detecting section 59.

In the present embodiment, the tray-detecting section 61 is a detecting unit that detects switching of the paper receiving tray 18 to the third state illustrated in FIG. 2 and may be constituted by, for example, a contact sensor. Note that, by detecting a driving direction of the tray driving motor 60 and an increase in driving current value, the control section 50 is able to detect switching of the paper receiving tray 18 to the first state or the second state.

Note that, needless to say, a sensor for detecting the first state and a sensor for detecting the second state may be additionally provided.

Note that a rotary encoder (not illustrated) is also provided in the tray driving motor 60, and the control section 50 is able to identify a rotation direction and a rotation amount of the tray driving motor 60 in accordance with a signal output from the rotary encoder.

The control section 50 includes a CPU 54, a flash ROM 55, and a RAM 56. The CPU 54 performs various computational processing according to a program stored in the flash ROM 55 and controls the overall operation of the printer 1. A program for controlling the light-emitting section 23 described later is also stored in the flash ROM 55. The flash ROM 55 is a readable-and-writable non-volatile memory. Various kinds of setting information input by the user via the operation panel 6 are also stored in the flash ROM 55. Various kinds of information are temporarily stored in the RAM 56, which is an example of a storage unit.

The control section 50 also includes an interface 62 and is able to communicate with an external computer 90 via the interface 62.

Next, the discharging port 17 will be further described. The discharging port 17 is at a discharging position at which paper subjected to recording by the recording head 15 is discharged in the Y-axis direction.

An upper edge of the discharging port 17 is formed by an opposing section 20 opposing the paper receiving tray 18 or a recording surface of paper subjected to recording as illustrated also in FIGS. 2 and 3.

Figure 6:
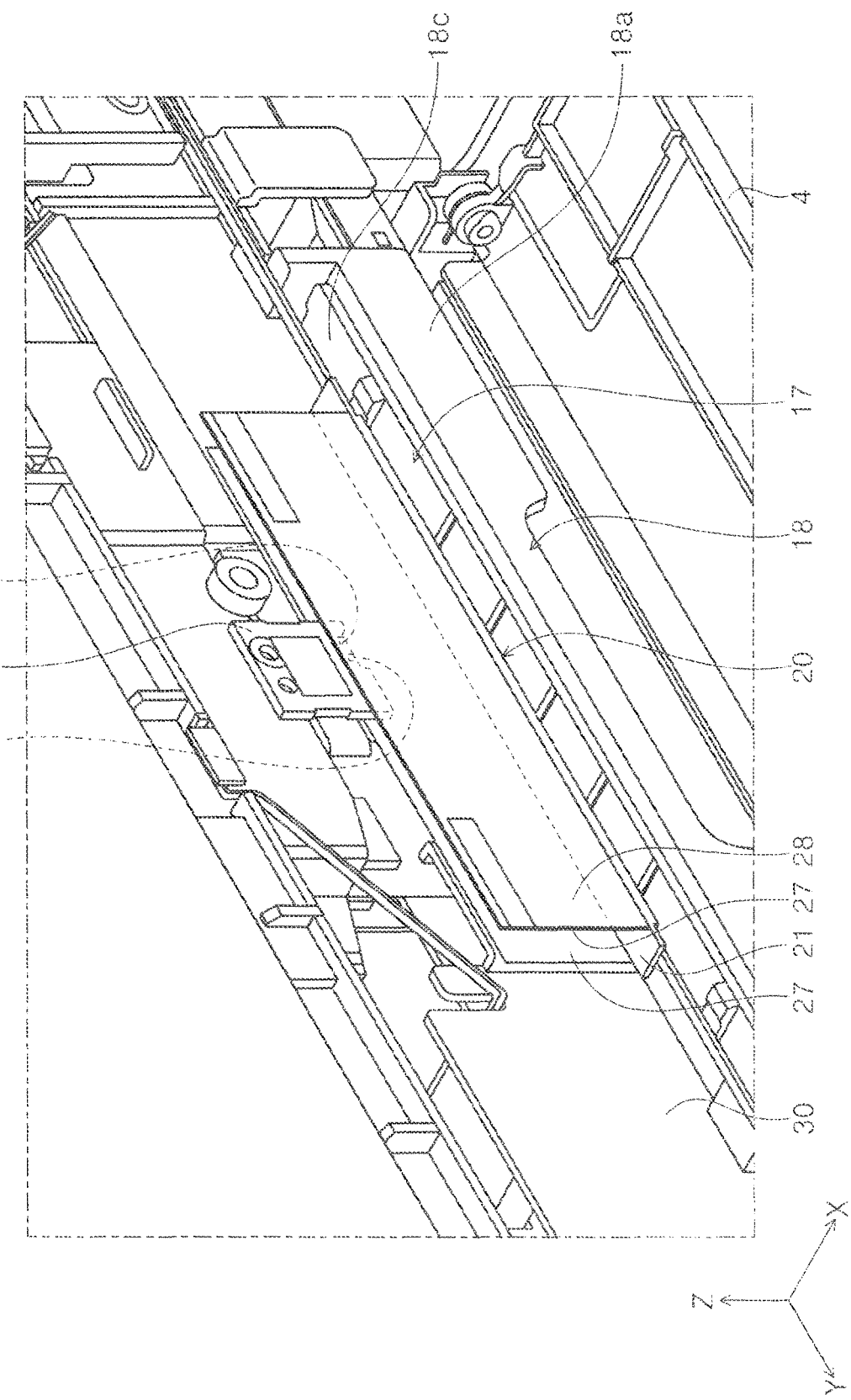
FIG. 6 is an enlarged perspective view of a portion of a front surface of the printer in a state in which a front cover is detached to expose a substrate.
Figure 7:
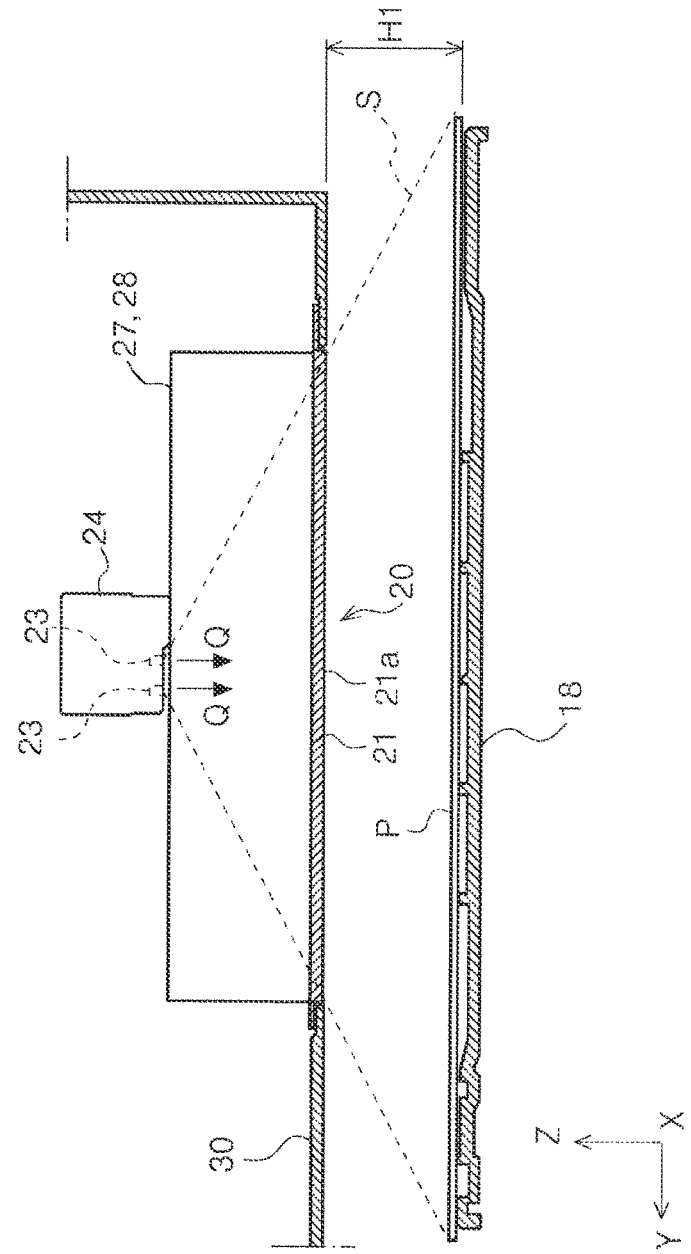
FIG. 7 illustrates an illumination range of a light-emitting section viewed in a paper discharging direction.
Figure 8:
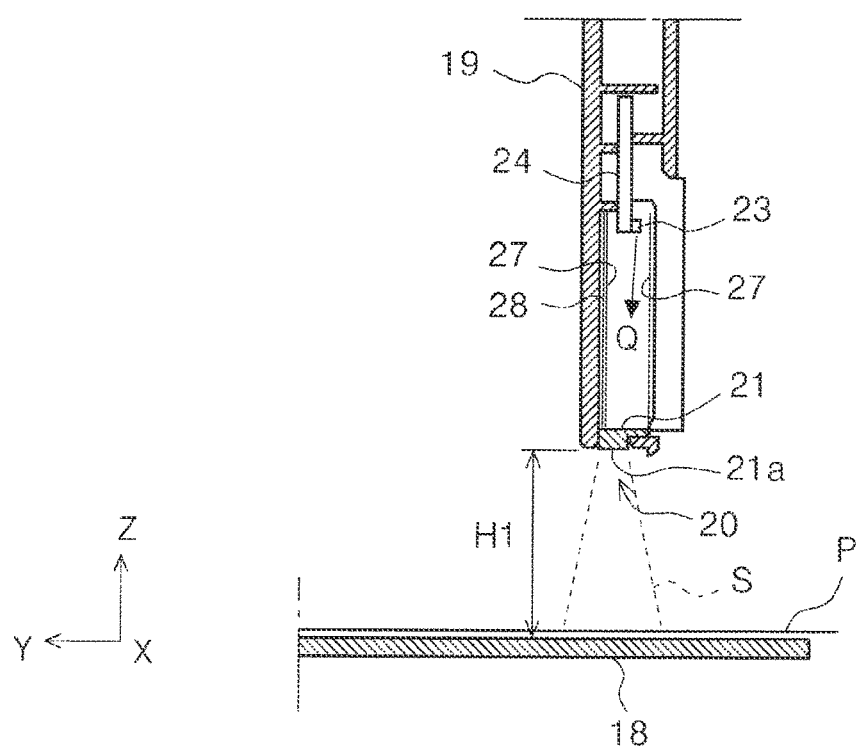
FIG. 8 illustrates the illumination range of the light-emitting section viewed in a paper width direction.

The opposing section 20 includes an optical member 21 as illustrated in FIGS. 6 to 8. The optical member 21 is attached to a frame 30 so as to be positioned in the center of a region through which the paper passes in the X-axis direction, that is, the paper width direction. In other words, the center portion of the discharged paper in the paper width direction substantially coincides with the center position of the optical member 21 in the X-axis direction.

The optical member 21 is formed of a material having a light-transmission property and functions as a lens. In the present embodiment, the optical member 21 is formed of a colorless and transparent resin material, and an opposing surface 21a opposing the recording surface of the paper is made of frosted glass.

The light-emitting section 23 is provided in the +Z direction with respect to the optical member 21. In the present embodiment, the light-emitting section 23 is constituted by a white LED. In the present embodiment, two light-emitting sections 23 are provided in a substrate 24 with a gap therebetween in the X-axis direction, that is, the paper width direction. The two light-emitting sections 23 are arranged symmetrically with respect to the center position of the optical member 21 in the X-axis direction, that is, the paper width direction.

The light-emitting section 23 emits light to the optical member 21 in a direction indicated by arrow Q in FIGS. 7 and 8. In other words, the optical member 21 is at a position of incidence of light emitted from the light-emitting section 23. Paper P in FIGS. 7 and 8 is paper to be discharged. The optical member 21 emits the incident light in a direction toward a recording surface of the paper P. The visible light emitted from the optical member 21 to the recording surface of the paper P diverges in the paper width direction as illustrated in FIG. 7 and diverges in the paper transport direction as illustrated in FIG. 8.

As illustrated in FIGS. 6 and 8, reflection sheets 27 are provided upstream and downstream in the paper transport direction with respect to an optical path of the light emitted from the light-emitting section 23. In other words, the paired reflection sheets 27 are provided so as to sandwich the optical path of the light emitted from the light-emitting section 23. Each of the reflection sheets 27 extends from the position of the light-emitting section 23 in the Z-axis direction to the position of an upper surface of the optical member 21. The reflection sheet 27 covers almost the entire region of the optical member 21 in the X-axis direction. The reflection sheet 27 may be constituted by, for example, a white sheet material.

A light-shielding sheet 28 is provided between the reflection sheet 27, which is closer than the other reflection sheet 27 to a front panel 19, and the front panel 19. In the present embodiment, dimensions of the light-shielding sheet 28 in the X-axis direction and the Z-axis direction are similar to those of the reflection sheet 27. The light-shielding sheet 28 may be constituted by, for example, a black sheet material.

FIGS. 7 and 8 each illustrate an instance in which the paper receiving tray 18 is in the third state illustrated in FIG. 2 and in which, for example, A4-size paper is discharged to the paper receiving tray 18 with a long side thereof in the paper transport direction. In FIGS. 7 and 8, range S indicates an illumination range of light emitted from the optical member 21 to the recording surface of the paper P.

Since the opposing surface 21a is made of frosted glass, the light emitted from the light-emitting section 23 that is incident on the optical member 21 is diffused in the paper width direction inside the optical member 21 and is then emitted to the recording surface of the paper. In the present embodiment, the illumination range has a width that covers the entire region of a short side of A4-size paper.

Note that, in FIGS. 7 and 8, gap H1 indicates a gap between the paper receiving tray 18 and the optical member 21 in the Z-axis direction, that is, a direction orthogonal to the recording surface of the paper. Gap H1 may be defined as, for example, 30 mm or less. Thereby, a gap between the recording surface of the paper P and the optical member 21 is 30 mm or less.

As described above, since the opposing section 20 opposing the recording surface of the paper at the discharging position at which the paper subjected to recording by the recording head 15 is discharged is at the position of incidence of the light emitted from the light-emitting section 23 and is arranged opposite to the recording surface of the paper, and since the opposing section 20 includes the optical member 21 that emits the incident light at least in the direction toward the recording surface of the paper, it is possible to view a recording result clearly and promptly, that is, before completion of recording, thus making it possible for a user to respond appropriately.

Since the illumination range of the optical member 21 with respect to a recording surface of paper has a width that covers the entire recording surface of a first-size paper in the paper width direction, it is possible to view a recording result more appropriately. Note that the first-size paper in the present embodiment is A4-size paper but is not limited thereto.

Note that, when the first-size paper is the maximum size of paper that is able to be transported, paper of any size is able to be illuminated with light across the entire width direction.

Moreover, in the present embodiment, since the optical member 21 is a member in which the opposing surface 21a opposing the recording surface of the paper is made of frosted glass and which has a light-transmission property, the light emitted from the light-emitting section 23 is able to be diffused in a wider range.

Note that, as a way of diffusing the light emitted from the light-emitting section 23 in a wider range, instead of or in addition to forming the opposing surface 21a made of frosted glass, the optical member 21 may be formed by a member that has a light-transmission property and that contains a light-diffusing agent.

As the light-diffusing agent, barium sulfate, calcium carbonate, silicon oxide, magnesium carbonate, aluminum hydroxide, titanium oxide, zinc oxide, synthetic silica, glass beads, or the like may be used.

Moreover, needless to say, diffusing the light emitted from the light-emitting section 23 in a wider range is not limited to the opposing surface 21a being made of frosted glass or to a light-diffusing agent being used.

In the present embodiment, since the gap between the recording surface and the optical member 21 in the direction orthogonal to the recording surface of the paper is set to 30 mm or less, a recording result is able to be viewed clearly at a position at which the paper is discharged.

Note that the gap between the recording surface and the optical member 21 may be greater than 30 mm as long as a sufficient amount of light reaches the recording surface.

In the present embodiment, since the paired reflection sheets 27 are provided so as to sandwich the optical path of the light emitted from the light-emitting section 23 to the optical member 21, it is possible to ensure that a sufficient amount of the light is emitted from the optical member 21 to the recording surface of the paper. Note that the reflection sheets 27 may be omitted as long as a sufficient amount of light is able to be ensured without using a reflection sheet 27.

In the present embodiment, since the light-shielding sheet 28 is provided between the reflection sheet 27, which is closer than the other reflection sheet 27 to the front panel 19 serving as a wall section forming the apparatus front surface, and the front panel 19, it is possible to suppress light from leaking from the front panel 19 to the front side of the apparatus. Note that the light-shielding sheet 28 may be omitted when leakage of light from the apparatus via the front panel 19 is difficult to visually detect due to a high light-shielding effect of the front panel 19.

Next, control performed by the control section 50 (FIG. 5) for the light-emitting section 23 will be described.

When recording is performed on the paper, and when the paper subjected to recording is discharged, the control section 50 causes the light-emitting section 23 to emit light at least until a leading end of the paper reaches a position opposing the opposing section 20 and a trailing end of the paper then passes the position opposing the opposing section 20. That is, the recording surface of the paper is illuminated with light from the leading end to the trailing end of the paper.

This is the most basic form of light emission of the light-emitting section 23. Note that light emission of the light-emitting section 23 includes continuous emission and flashing, and light emission while the leading end of the paper reaches the position opposing the opposing section 20 and the trailing end of the paper then passes the position opposing the opposing section 20 is performed by continuous emission in the present embodiment.

Figure 9:
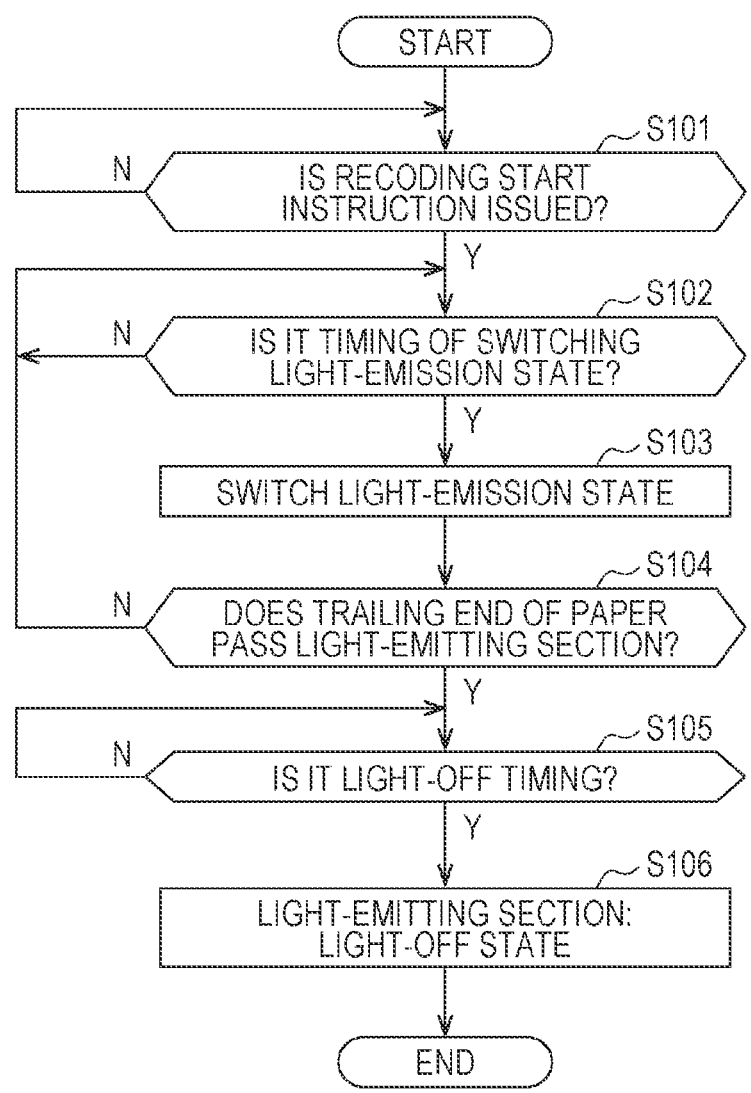
FIG. 9 is a flowchart of control of the light-emitting section.

The control section 50 controls on and off of light emission by the light-emitting section 23 as described below in accordance with the aforementioned description regarding light emission of the light-emitting section 23. FIG. 9 illustrates a flow of control performed by the control section 50 for the light-emitting section 23. Upon receiving a recording start instruction (Yes in step S101), the control section 50 determines whether or not it is a timing of switching the light-emission state of the light-emitting section 23 (step S102).

When determining that it is the timing of switching the light-emission state of the light-emitting section 23 (Yes in step S102), the control section 50 switches the light-emission state of the light-emitting section 23 (step S103). Note that switching of the light-emission state of the light-emitting section 23 includes switching between a light-off state, a light-on state, and a flashing state of the light-emitting section 23 and retaining each of the states.

The control section 50 then determines whether a trailing end of paper passes the position of the light-emitting section 23 (step S104). More specifically, an affirmative condition for step S104 is satisfied in any instance in which the trailing end of the paper passes the position opposing the opposing section 20, in which a given time has lapsed after the trailing end of the paper passes the position opposing the opposing section 20, in which a given time has lapsed after a recording operation on the paper is completed, and in which a given time has lapsed after a paper discharging operation is completed. When the trailing end of the paper passes the position of the light-emitting section 23 (Yes in step S104), the control section 50 then determines whether or not it is a light-off timing (step S105). When the trailing end of the paper has not yet passed the position of the light-emitting section 23 (No in step S104), the control section 50 repeatedly performs steps S102 to S104.

Next, when determining that it is the light-off timing (Yes in step S105), the control section 50 switches the light-emitting section 23 to a light-off state (step S106).

Details of steps S102 and S103 will be described below. In the present embodiment, switching of the light-emission state of the light-emitting section 23 in steps S102 and S103 is performed in accordance with the operation of the paper receiving tray 18.

In the present embodiment, regarding switching of the light-emission state of the light-emitting section 23 in steps S102 and S103, (1) and (2) below are adopted. When a situation corresponds to any of (1) and (2), the control section 50 switches the light-emission state of the light-emitting section 23. It is needless to say that any of (1) and (2) below may be adopted.

(1) When causing the paper receiving tray 18 in the first state to protrude from the apparatus main body 2, the control section 50 determines that the affirmative condition for step S102 is satisfied, and the procedure shifts to step S103. That is, the control section 50 controls the light-emitting section 23 in accordance with the operation of the paper receiving tray 18. Note that, when the paper receiving tray 18 is in the first state, the light-emitting section 23 is by default in the light-off state.

More specifically, it is determined that the affirmative condition for step S102 is satisfied at the same time as starting driving of the tray driving motor 60 (refer to FIG. 5) or at a timing before or after starting, and the procedure then shifts to step S103. That is, the control section 50 causes the light-emitting section 23 to emit light in response to control of the tray driving motor 60 that causes the paper receiving tray 18 to protrude from the apparatus main body 2. In such an instance, light emission of the light-emitting section 23 in step S103 may be performed by any of continuous emission and flashing.

In this manner, upon receiving the recording start instruction when the paper receiving tray 18 is in the first state and the light-emitting section 23 is in the light-off state, the control section 50 causes the light-emitting section 23 to emit light in response to control of the tray driving motor 60 that causes the paper receiving tray 18 to protrude from the apparatus main body 2.

Such light emission from the light-emitting section 23 enables the user to view switching of the state of the paper receiving tray 18.

(2) When the paper receiving tray 18 does not switch to a target state even after the tray driving motor 60 (refer to FIG. 5) is driven by a predetermined amount, the control section 50 determines that the affirmative condition for step S102 is satisfied, and the procedure shifts to step S103. That is, the control section 50 controls the light-emitting section 23 in accordance with the operation of the paper receiving tray 18. The control section 50 then switches the light-emission state of the light-emitting section 23 in step S103. For example, the control section 50 causes the light-emitting section 23 to flash.

The target state of the paper receiving tray 18 is, for example, the third state in FIG. 2. More specifically, when no change in detection signal of the tray-detecting section 61 (refer to FIG. 5) is present even after the tray driving motor 60 is driven by a first driving amount, the control section 50 determines that the affirmative condition for step S102 is satisfied, and the procedure shifts to step S103 in which the control section 50 causes the light-emitting section 23 to flash. The first driving amount is defined as an amount obtained by adding an additional amount to a theoretical driving amount of the tray driving motor 60 for switching the paper receiving tray 18 from the first state to the third state.

As a result, flashing of the light-emitting section 23 enables the user to be notified when an abnormality occurs in the operation of the paper receiving tray 18.

Note that, for example, if an obstacle has entered an operation region of the paper receiving tray 18 and come into contact with the paper receiving tray 18, an abnormality thus occurs, and the user may then remove the obstacle and perform an error resetting operation via the operation panel 6. When such an error resetting operation is performed, the control section 50 is able to resume control of the tray driving motor 60.

Note that it is suitable that, when the error resetting operation is performed, the control section 50 changes the light-emission state of the light-emitting section 23 from the flashing state to the light-off state, and when the control section 50 resumes control of the tray driving motor 60, the control section 50 changes the light-emission state from the light-off state to the light-on state. Thereby, the user is able to visually identify that an abnormal state has been exited.

Note that, in the present embodiment, when causing the paper receiving tray 18 in the first state to protrude from the apparatus main body 2 in a state in which a recording execution instruction is received as described above, the control section 50 causes the light-emitting section 23 to emit light. However, for example, when an operation button for switching the state of the paper receiving tray 18 is provided on a UI of the operation panel 6 and the paper receiving tray 18 switches from the first state to the second state or the third state in response to a user operation, control in step S102 and subsequent steps may be performed whether or not a recording execution instruction exists.

Next, details of step S105 will be described. In the present embodiment, a light-off operation of the light-emitting section 23 in steps S105 and S106 is not performed in accordance with the state or operation of the paper receiving tray 18, but it is needless to say that the light-off operation may be performed in accordance with the state or operation of the paper receiving tray 18.

In the present embodiment, regarding the light-off state of the light-emitting section 23 in steps S105 and S106, any of (3) to (7) below may be adopted. Needless to say, a plurality or all of (3) to (7) below may be adopted.

(3) When the trailing end of the paper passes the position opposing the opposing section 20, when a given time has lapsed after the trailing end of the paper passes the position opposing the opposing section 20, when a given time has lapsed after a recording operation on the paper is completed, or when a given time has lapsed after a paper discharging operation is completed, it is determined that the affirmative condition for step S105 is satisfied, and the control section 50 causes the light-emitting section 23 to enter a light-off state in step S106. By causing the light-emitting section 23 to enter a light-off state as described above, it is possible to suppress wasteful power consumption. Note that, when the control section 50 switches the light-emitting section 23 to the light-off state in accordance with the recording operation on the paper or the discharging operation, it is desirable that control be performed at least such that the discharged paper is illuminated with light from the leading end to the trailing end as described above.

(4) When the operation button for switching the state of the paper receiving tray 18 is provided on the UI of the operation panel 6 and the user issues, via the operation panel 6, an instruction for causing the paper receiving tray 18 to be stored, it is determined that the affirmative condition for step S105 is satisfied, and the control section 50 switches the light-emitting section 23 to the light-off state in step S106.

(5) When a mode shifts to a power-saving mode for saving power while the light-emitting section 23 emits light, it is determined that the affirmative condition for step S105 is satisfied, and the control section 50 switches the light-emitting section 23 to the light-off state in step S106.

Note that, when the paper receiving tray 18 is in a state other than the first state at the time of shifting the mode to the power-saving mode, the control section 50 may switch the state to the first state. At this time, the light-emitting section 23 may be switched to the light-off state, for example, at the same time as starting driving of the tray driving motor 60 (refer to FIG. 5), at a timing before or after starting, at the same time as stopping driving of the tray driving motor 60, or at a timing before or after stopping. In such an instance, the light-emitting section 23 is controlled in accordance with the operation of the paper receiving tray 18. As a result, it is possible to suppress wasteful power consumption.

(6) When a power button 49 (refer to FIGS. 1 to 3) is pressed while the light-emitting section 23 emits light, it is determined that the affirmative condition for step S105 is satisfied, and the control section 50 switches the light-emitting section 23 to the light-off state in step S106.

Note that, when the paper receiving tray 18 is in a state other than the first state at the time of shifting the state to a power-off state, the control section 50 may switch the state to the first state. At this time, the light-emitting section 23 may be switched to the light-off state, for example, at the same time as starting driving of the tray driving motor 60 (refer to FIG. 5), before or after starting, at the same time as stopping driving of the tray driving motor 60, or before or after stopping. In such an instance, the light-emitting section 23 is controlled in accordance with the operation of the paper receiving tray 18. As a result, the user is able to visually identify that the state of the apparatus has appropriately shifted to the power-off state.

(7) When an error occurs after a recording operation starts, it is determined that the affirmative condition for step S105 is satisfied, and the control section 50 switches the light-emitting section 23 to the light-off state in step S106. The error includes paper jamming or ink shortage. By switching the light-emitting section 23 to the light-off state as described above, it is possible to suppress wasteful power consumption. Note that, when the error is reset, the control section 50 desirably causes the light-emitting section 23 to emit light again.

In a configuration in which the state of the paper receiving tray 18 is able to be switched in accordance with not driving a motor but rather in response to a user operation and in which a unit that detects at least whether or not the paper receiving tray 18 is in the first state is provided, the control section 50 may control the light-emitting section 23 as described below.

That is, upon receiving a recording execution instruction when the paper receiving tray 18 is in the first state and the light-emitting section 23 is in the light-off state, the control section 50 does not cause the light-emitting section 23 to emit light and retains the light-off state. That is, the timing of receiving the recording execution instruction is regarded as the timing of controlling the light-emission state of the light-emitting section 23, and the control section 50 controls the light-emitting section 23 in accordance with the state of the paper receiving tray 18. Such control of the light-emitting section 23 enables the user to determine that the situation is one in which the state of the paper receiving tray 18 is to be switched.

Note that, in such an instance, until the paper receiving tray 18 exits the first state, the control section 50 desirably suspends starting the recording operation.

Upon receiving the recording execution instruction when the paper receiving tray 18 is in a state other than the first state and the light-emitting section 23 is in the light-off state, the control section 50 causes the light-emitting section 23 to emit light. Also in such an instance, the timing of receiving the recording execution instruction is regarded as the timing of controlling the light-emission state of the light-emitting section 23, and the control section 50 controls the light-emitting section 23 in accordance with the state of the paper receiving tray 18. Note that, in such an instance, light emission of the light-emitting section 23 is performed by continuous emission. By controlling the light-emitting section 23 as described above, the user is able to identify that the state is a state in which recording is possible.

In an instance in which the state of the paper receiving tray 18 is able to be switched in accordance with not driving a motor but rather in response to a user operation as described above and in which a unit that detects whether or not the paper receiving tray 18 is in the first state is provided, when the paper receiving tray 18 in the first state exits the first state, the control section 50 may cause the light-emitting section 23 to emit light. That is, the control section 50 controls the light-emitting section 23 in accordance with the operation of the paper receiving tray 18. Note that, in such an instance, light emission of the light-emitting section 23 is performed by continuous emission. Such control of the light-emitting section 23 enables the user to identify that the paper receiving tray 18 has switched to a state in which recording is possible.

In an instance in which the state of the paper receiving tray 18 is able to be switched in accordance with not driving a motor but rather in response to a user operation as described above and in which a unit that detects whether or not the paper receiving tray 18 is in the first state is provided, when the paper receiving tray 18 switches to the first state in response to a user operation while the paper receiving tray 18 is in a state other than the first state and the light-emitting section 23 emits light, the control section 50 may switch the light-emitting section 23 to the light-off state. That is, the control section 50 controls the light-emitting section 23 in accordance with the operation of the paper receiving tray 18. By controlling the light-emitting section 23 as described above, it is possible to suppress wasteful power consumption.

Since the control section 50 that controls the light-emitting section 23 as described above controls the light-emitting section 23 in accordance with the state or operation of the paper receiving tray 18, it is possible for a status regarding discharging of the paper to be clearly visually indicated, thereby improving usability.

For example, when the paper receiving tray 18 switches from the first state to the second state or the third state, that is, when the paper receiving tray 18 protrudes from the apparatus main body 2, it is possible to notify the user of the operation. In particular, in a dark environment, it is difficult for the protruding operation of the paper receiving tray 18 to be seen, but light emission of the light-emitting section 23 enables the user to identify the operation of the paper receiving tray 18 even in a dark environment. As a result, for example, when an obstacle has entered the operation region of the paper receiving tray 18, it is possible to suppress the paper receiving tray 18 from coming into contact with the obstacle.

Note that controlling the light-emitting section 23 in accordance with the state of the paper receiving tray 18 means controlling the light-emitting section 23 by referring to the state of the paper receiving tray 18. Moreover, controlling the light-emitting section 23 in accordance with the operation of the paper receiving tray 18 means controlling the light-emitting section 23 in association with the operation of the paper receiving tray 18. The operation of the paper receiving tray 18 includes operation when power is received from the tray driving motor 60 and operation when the paper receiving tray 18 is moved by the user.

Moreover, control of the light-emitting section 23 includes switching between the states of the light-off state, the light-on state, and the flashing state of the light-emitting section 23 and retaining each of the states as described above.

Regarding switching of the light-emission state of the light-emitting section 23, any, a plurality, or all of (8) to (10) below may be adopted.

(8) A unit that detects opening and closing of the front cover 4 is provided, and when detecting that the front cover 4 is opened, the control section 50 causes the light-emitting section 23 to emit light. This is because, when the front cover 4 is opened, the paper receiving tray 18 switches from the first state to the third state or the second state, and the paper may be discharged. Note that such control is able to be replaced with, for example, control of (1) described above.

(9) A unit that detects a state of the operation panel 6 is provided, and when detecting that the operation panel 6 in a fully closed state illustrated in FIGS. 1 to 3 is tilted upward, the control section 50 causes the light-emitting section 23 to emit light. This is because, when the operation panel 6 is tilted upward, the paper receiving tray 18 switches from the first state to the third state or the second state, and the paper may be discharged. Note that such control is able to be replaced with, for example, control of (1) described above.

(10) In an instance in which a silent mode in which sound is suppressed by the control section 50 performing a feeding operation or a recording operation at a low speed is able to be carried out, when the silent mode is selected, the control section 50 causes the light-emitting section 23 to emit light. Although a paper transport speed is low in the silent mode, by causing the light-emitting section 23 to emit light in such a mode, it is possible to check a recording result more reliably without rushing. Note that such control is able to be replaced with, for example, control of (1) described above.

The light-off timing in step S105 may be set to any of (11) to (14) below. Needless to say, a plurality or all of (11) to (14) below may be adopted.

(11) A unit that detects the presence and absence of the paper on the paper receiving tray 18 is provided, and when the paper on the paper receiving tray 18 is removed, the control section 50 switches the light-emitting section 23 to the light-off state. It is thereby possible to suppress wasteful power consumption. Note that such control is able to be replaced with, for example, control of (3) described above.

(12) A unit that detects opening and closing of the front cover 4 is provided, and when detecting that the front cover 4 is closed, the control section 50 switches the light-emitting section 23 to the light-off state. This is because, when the front cover 4 is closed, no paper may be discharged to the paper receiving tray 18. Note that such control is able to be replaced with, for example, control of (3) described above.

(13) A unit that detects a state of the operation panel 6 is provided, and when detecting that the operation panel 6 in an upwardly tilted state (not illustrated) is brought into the fully closed state as illustrated in FIGS. 1 to 3, the control section 50 switches the light-emitting section 23 to the light-off state. This is because, the fully closed state of the operation panel 6 signifies that the user has stopped using the apparatus. Note that such control is able to be replaced with, for example, control of (3) described above.

(14) A unit that detects an attachment state of the paper feed tray 5 is provided, and when the paper feed tray 5 is detached from the apparatus main body 2, the control section 50 switches the light-emitting section 23 to the light-off state. In the state in which the paper feed tray 5 is detached from the apparatus main body 2, no recording operation on a paper may be performed. Therefore, by switching the light-emitting section 23 to the light-off state in such a state, it is possible to suppress wasteful power consumption. Note that, when the paper feed tray 5 is attached again, the control section 50 may return the light-emitting section 23 to the original light-emission state.

In addition, the control section 50 may control the light-emitting section 23 as described below. For example, when A4-size paper is discharged with a long side thereof in the Y-axis direction, the control section 50 causes the light-emitting section 23 to be in a light-on state, and when A3-size paper is discharged with a long side thereof in the Y-axis direction, the control section 50 causes the light-emitting section 23 to flash. Thereby, the user is able to visually determine whether the size of the discharged paper is A4 or A3.

It is needless to say that the disclosure is not limited to the embodiment described above, that various modifications can be made within the scope of the disclosure described in the claims, and that these modifications are also included within the scope of the disclosure.

For example, in the aforementioned embodiment, the paper discharging device 34, which is an example of the medium-discharging device, is applied to the printer 1, which is an example of the recording apparatus, but there is no limitation thereto, and the paper discharging device 34 may be applied to, for example, an image reading apparatus that includes a reading section for reading a document image. Examples of the image reading apparatus include a document scanner that reads a document image while transporting a document.

What is claimed is:

1. A medium-discharging device comprising:
   a medium-discharging section that discharges a medium;
   a medium-receiving tray that receives the medium discharged by the medium-discharging section;
   a light-emitting section that emits light to the medium-receiving tray; and
   a control section that controls the light-emitting section,
   wherein
   the medium-receiving tray is configured to switch between a first state in which the medium-receiving tray is stored in an apparatus main body that includes the medium-discharging section and a second state in which the medium-receiving tray protrudes from the apparatus main body,
   the control section controls the light-emitting section in accordance with a state or operation of the medium-receiving tray, and
   when the control section causes the medium-receiving tray in the first state to protrude from the apparatus main body, the control section causes the light-emitting section to emit light.

2. The medium-discharging device according to claim 1, wherein
   the medium-receiving tray is configured to switch between the first state and the second state by receiving power from a motor controlled by the control section, and
   when the control section causes the medium-receiving tray in the first state to protrude from the apparatus main body, the control section causes the light-emitting section to emit light.

3. The medium-discharging device according to claim 1, wherein
   when the medium-receiving tray does not switch to a target state even after the motor is driven by a predetermined amount, the control section changes a light-emission state of the light-emitting section.

4. The medium-discharging device according to claim 1, wherein when a mode shifts to a power-saving mode for saving power in a state in which the light-emitting section emits light, and when the medium-receiving tray exits the first state and protrudes from the apparatus main body, the control section switches the light-emitting section to a light-off state.

5. The medium-discharging device according to claim 1, wherein when a power button is pressed in a state in which the medium-receiving tray exits the first state and protrudes from the apparatus main body and in which the light-emitting section emits light, the control section switches the light-emitting section to a light-off state.

6. A recording apparatus comprising:
   a recording section that performs recording on a medium; and
   the medium-discharging device according to claim 1 that discharges the medium subjected to recording by the recording section.

7. A recording apparatus comprising:
   a recording section that performs recording on a medium;
   a medium-discharging section that discharges the medium subjected to recording by the recording section;
   a medium-receiving tray that receives the medium discharged by the medium-discharging section;
   a light-emitting section that emits light to the medium-receiving tray; and
   the control section controls the light-emitting section in accordance with a state or operation of the recording apparatus and the medium-receiving tray,
   the medium-receiving tray is configured to switch between a first state in which the medium-receiving tray is stored in an apparatus main body that includes the medium-discharging section and a second state in which the medium-receiving tray protrudes from the apparatus main body,
   the medium-receiving tray is configured to switch between the first state and the second state by receiving power from a motor, and when the control section causes the medium-receiving tray in the first state to protrude from the apparatus main body, the control section causes the light-emitting section to emit light.

\* \* \* \* \*